United States Patent [19]

Flig et al.

[11] Patent Number: 4,841,287

[45] Date of Patent: Jun. 20, 1989

[54] EARTHQUAKE UTILITIES CUT-OFF CONTROL SYSTEM

[76] Inventors: Alan Y. Flig, 13127 Bassett St., North Hollywood, Calif. 91605; Paul Regan, 5541 Willis Ave., Van Nuys, Calif. 91411

[21] Appl. No.: 134,052

[22] Filed: Dec. 17, 1987

[51] Int. Cl.⁴ ............................................. G08B 21/00
[52] U.S. Cl. .................................... 340/690; 137/39; 200/61.45 R; 307/117; 361/170
[58] Field of Search .......................... 340/690; 137/39; 361/335, 333, 37, 170; 200/61.45 R, 61.46, 61.45 M, 61.47, 61.48, DIG. 20; 307/117

[56] References Cited

U.S. PATENT DOCUMENTS

| | | | |
|---|---|---|---|
| 4,098,284 | 7/1978 | Yamada | 137/39 |
| 4,180,088 | 12/1979 | Mallett | 137/38 |
| 4,262,687 | 4/1981 | Kobayashi | 137/39 |
| 4,390,922 | 6/1983 | Pelliccia | 361/170 |
| 4,414,994 | 11/1983 | Hogan | 200/61.47 |

FOREIGN PATENT DOCUMENTS

| | | | |
|---|---|---|---|
| 0527697 | 1/1977 | Japan | 137/39 |
| 0034337 | 3/1977 | Japan | 361/335 |
| 0017944 | 2/1978 | Japan | 361/335 |
| 0161377 | 4/1982 | Japan | 137/39 |

Primary Examiner—Joseph A. Orsino
Assistant Examiner—Jill D. Jackson
Attorney, Agent, or Firm—Shlesinger & Myers

[57] ABSTRACT

A seismic detector which generates an electrical signal in response to the occurrence of a vertical seismic wave predetermined magnitude is mounted in a weather-proof container in or adjacent an inhibitable building. A circuit breaker to interupt electrical power to the building is mounted in the same container and connected to open in response to signals from the detector. Gas and water line connections each with a solenoid operated shut-off valve are separately housed in a weather-proof container in or adjacent the building and the valves are connected so that they will close in response to a signal from the seismic detector. The entire system is rendered fail safe through the use of an interruptible power supply system housed in the container with the seismic detector and connected to energize the gas and water line cut off valves to hold them in open condition. In response to a signal from the seismic detector, however, the circuit between the power supply and the cutoff valves is opened which cuts off all utilities to the building.

15 Claims, 2 Drawing Sheets

4,841,287

EARTHQUAKE UTILITIES CUT-OFF CONTROL SYSTEM

BACKGROUND OF THE INVENTION

Seismic disturbance detectors are known as well as systems which combine such detectors with utility control arrangements in order to provide for automatic cut off of gas, water and electric utilities to a building in the event of earthquakes of a predetermined magnitude. Examples of such devices may be found in the following U.S. Pat. Nos.: 3,714,456, 4,214,238, 4,390,922, 4,408,196 and 4,528,559.

None of these devices have achieved wide spread acceptance for a variety of reasons.

OBJECTS AND SUMMARY OF THE INVENTION

An object of this invention is to an automatic shut-off system which is compact, easy to install and inexpensive to manufacture.

A further object of this invention is to provide a system which is pre-packaged.

Yet another object of this invention is to provide a system having two compartments for ease in access, separating the primary electrical components from the utility cut-off control devices.

The present invention embodies an arrangement of known devices so packaged as to satisfy all U.L.'s requirements and those of the National Electrical Manufacturers Association. The entire system constitutes a fail safe arrangement wherein electrical signals generated by a seismic detector are employed in combination with an uninterruptible power supply system to automatically shut off all utilities to a building. The power supply and seismic detection equipment together with a circuit breaker for terminating electrical service to the building are housed separately from the gas and water lines and cut off valves for each.

DETAILED DESCRIPTION

Figure 1:
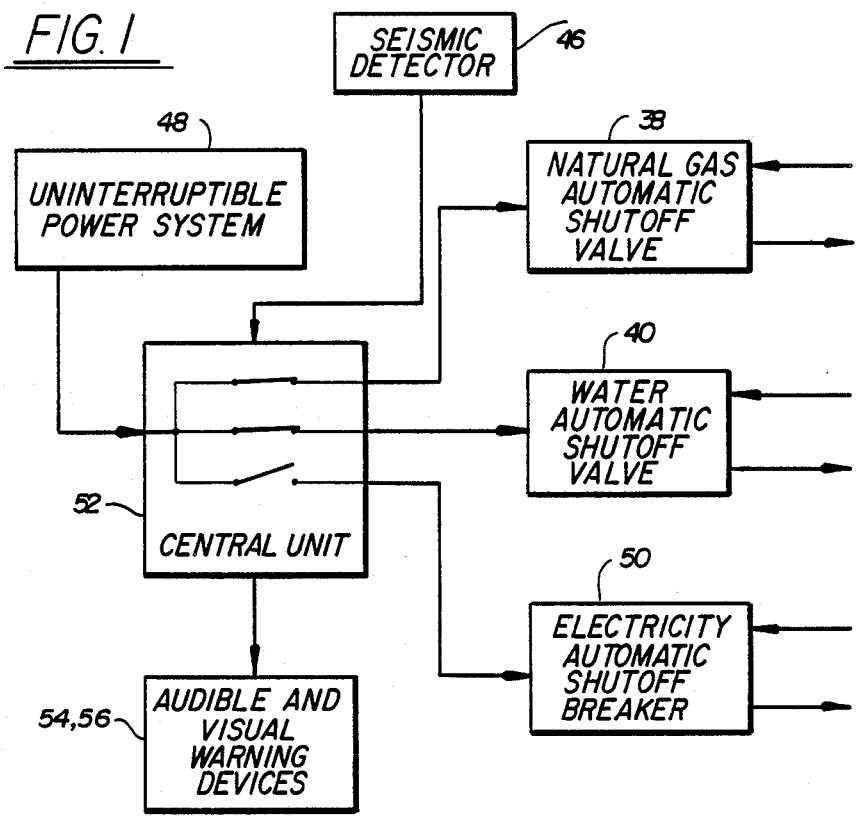
FIG. 1 is a block diagram of the basic components of the present system.

Referring first to FIG. 1, a central unit is indicated as being supplied with electrical power from an uninterruptible power system. The latter is a well known article of commerce as for example, one manufactured by Square D Company. As indicated in this Figure, the central unit includes normally closed switches supplying energy from the uninterruptible power system to both the natural gas automatic shut off valve and the water automatic shut off valve. So long as these switches remain closed, the automatic shut off valves are open and service to the building continues. The control for cut off of electrical service is the reverse in that the switch supplying current thereto from the uninterruptible system is normally open. In response to a signal from the seismic detector, the condition of the switches as shown in FIG. 1 is reversed which automatically cuts off all utilities service to the building. At the same time, an audible and/or visual warning device may also be activated.

Figure 2:
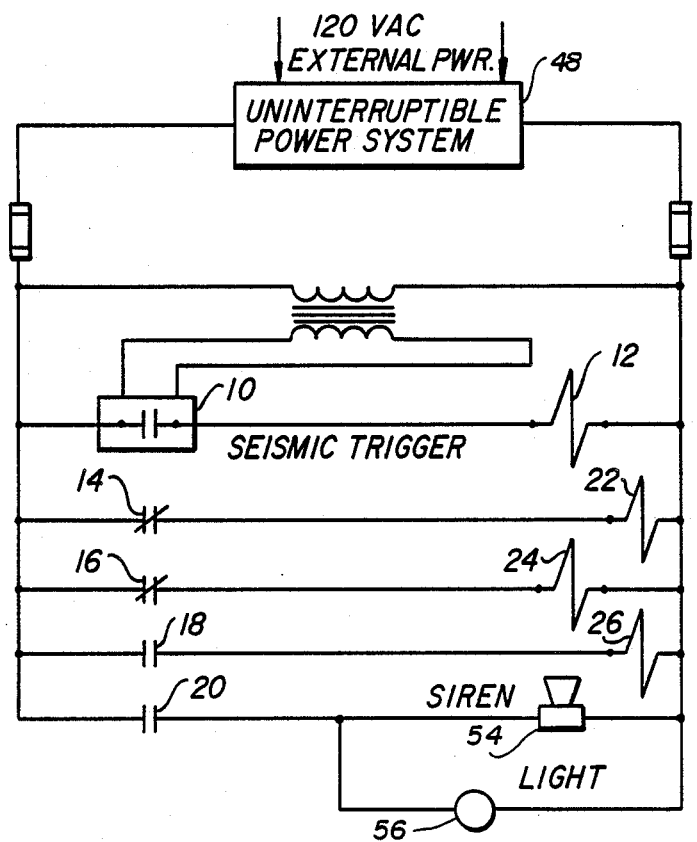
FIG. 2 is a schematic wiring diagram.

FIG. 2 is simply a schematic diagram conforming to the parts arrangement of FIG. 1. The presence of a signal from the seismic detector of FIG. 1 will close the switch 10 of the seismic trigger to energize the control relay 12. The latter may have four sets of contacts 14, 16, 18 and 20, the first two of which are normally closed and the latter two are normally open. Energization of relay 12, therefore, will open the contacts 14 and 16 and close the contacts 18 and 20. This, in turn, is effective to deenergize coils 22 and 24 while energizing coil 26 and the audio visual devices labeled as siren and light. Coils 22 and 24 control the cut off valves for the gas and water lines which are automatically closed as soon as these coils are deenergized.

Figure 3:
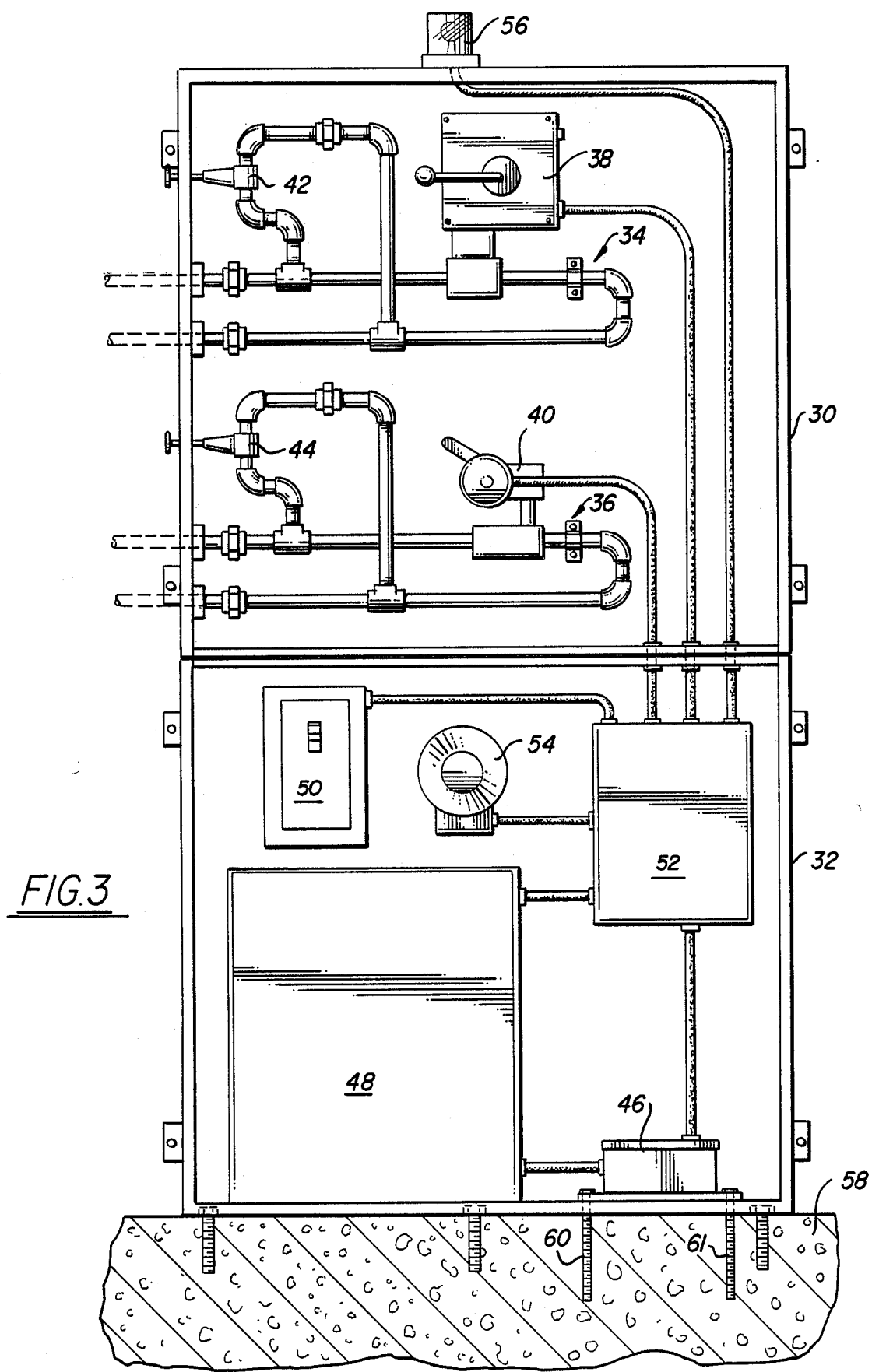
FIG. 3 shows the apparatus of the present invention housed in separate containers.

FIG. 3 shows a preferred arrangement of the parts of FIG. 1 as they would be housed in pre-packaged units for installation at any given building. Basically, the packaging involves a pair of weatherproof enclosures 30 and 32 having secured access doors (not shown). The upper enclosure 30 houses closed piping loops 34 and 36 for gas and water respectively. Each loop includes a solenoid operated cut off valve 38 and 40. Valves 38 and 40 are electrically operated and, once closed, may be manually reopened only after the electrical power is reconnected to the valves. In addition, manually operated cut off valves 42 and 44 are provided in each closed loop to by-pass the automatic valves 38 and 40. The operating means for the manual valves is accessible from the exterior of the cabinet 30. The closed loops 34 and 36 each terminate at the closure wall in means affording connection to the piping within the building and the supply main.

The lower enclosure 32 houses the other elements of the system including the seismic detector 46, the uninterruptible power supply 48, the electrical circuit breaker 50 and the central unit 52. An audible warning device such as a siren may also be included as indicated at 54 and a visible warning means may be positioned exteriorly of either cabinet as indicated for example, at 56.

The seismic detector 46 must be rigidly mounted on a base shown at 58. This is a concrete slab of approximately 18 inches thickness, 12 inches of which is below ground. The detector is rigidly bolted to the slab by bolts 60 and 61.

While the containers 30 and 32 are shown in FIG. 3 as immediately adjacent one another, this is not essential and they may be remote from each other. Relative positioning of the two will be dictated in each instance by the location of the utility mains with respect to the building.

While a preferred embodiment of the present invention is herein shown and described, applicants claim the benefit of a full range of equivalents within the scope of the appended claims.

We claim:

1. A fail-safe control system for automatic cut-off of gas, electric and water utilities in a building in the event of an earthquake, comprising:
   (a) an uninterruptible power supply for providing continuous power to said system;
   (b) an electrical seismic detector means, being connected to said uninterruptible power supply, and having an output for triggering an electric current upon the occurrence of an earthquake;
   (c) a control relay being connected to said seismic detector means and obtaining power from said output of said seismic detector means;

(d) electrically operated gas cut off means, being adapted to be positioned between the main gas supply and the building gas supply, and connected to said uninterruptible power supply, for interrupting the gas supply to the building upon an occurrence of an earthquake detected by said seismic detector means;

(e) electrically operated water cut-off means, being adapted to be positioned between the main water supply and the building water supply, and connected to said uninterruptible power supply, for interrupting the water supply to the building upon an occurrence of an earthquake detected by said seismic detector means;

(f) said gas and water cut off means being normally opened when energized and being closed when de-energized;

(g) first normally closed contact of said control relay being connected in series with said gas cut-off means, and said first contact being opened when said control relay is energized by said seismic detector means upon an occurrence of an earthquake detected by said seismic detector means, thereby de-energizing and closing said gas cut-off means;

(h) second normally closed contact of said control relay being connected in series with said water cut off means, and said contact being open when said control relay is energized by said seismic detector means upon an occurrence of an earthquake detected by said seismic detector means, thereby de-energizing and closing said water cut off means;

(i) electrically operated breaker trip means, being connected to said uninterruptible power supply, for tripping the main power supply breaker to the building when said breaker trip means is energized upon an occurrence of an earthquake detected by said seismic detector means;

(j) first normally open contact of said control relay being connected in series with said breaker trip means, and said normally open contact being closed when said control relay is energized by said seismic detector means upon an occurrence of an earthquake detected by said detector means, thereby energizing said breaker trip means and tripping the main power supply breaker to the building; and (k) said gas and water cut-off means and said breaker trip means being manually resetable after said seismic detector means has been activated in response to an earthquake.

2. A system as in claim 1, wherein:
(a) said seismic detector means is attached to a rigid horizontal supporting base partially buried in the ground for preventing non-earthquake disturbances from setting off said seismic detector means.

3. A system as in claim 1, and further comprising:
(a) a first enclosure having an inner bottom surface;
(b) said uninterruptible power supply, said seismic detector means and said control relay are disposed within said first enclosure for providing a compact assembly; and
(c) said seismic detector means is attached to said bottom surface and said bottom surface is attached to a rigid horizontal supporting base partially buried in the ground for preventing non-earthquake disturbances from setting off said seismic detector means.

4. A system as in claim 3, and further comprising:
(a) audio-visual alarm connected to said power supply and responsive to an earthquake detected by said seismic detector means, for providing indication to occupants of the building that an earthquake has been detected.

5. A system as in claim 4, wherein:
(a) said audio-visual alarm includes a second normally opened contact of said control relay connected in series with said audio-visual alarm, and said second normally opened contact closes when said control relay is energized by said seismic detector, thereby energizing and setting off said audio-visual alarm.

6. A system as in claim 4, and further comprising:
(a) a second enclosure for said electrically operated gas cut-off means.

7. A system as in claim 6, and further comprising:
(a) a manually operable gas by-pass valve, disposed within said second enclosure, connected across said electrically operated gas cut-off means, for by-passing said electrically operated gas cut-off means in the event of system failure causing said electrically operated gas cut-off means to be in the closed position, thereby permitting the flow of gas to the building.

8. A system as in claim 7, wherein:
(a) said manually operable gas by-pass valve is operable from the exterior of said second enclosure.

9. A system as in claim 8, and further comprising:
(a) a manually operable water by-pass valve, disposed within said second enclosure, connected across said electrically operated water cut-off means, for by-passing said electrically operated water cut-off means in the event of system failure causing said electrically operated water cut-off means to be in closed position, thereby permitting the flow of water to the building.

10. A system as in claim 9, wherein:
(a) said manually operable water by-pass valve is operable from the exterior of said second enclosure.

11. A fail-safe control system for automatic cut-off of a utility to a building in the event of an earthquake, comprising:
(a) an uninterruptible power supply for providing continuous power to said system;
(b) a first enclosure;
(c) a first electrically operated cut-off means, being disposed within said first enclosure, having opened and closed positions, connected to the utility supply main to the building and connected to said uninterruptible power supply, for controlling the flow of the utility therethrough;
(d) a seismic detector means, being connected to said cut-off means and said uninterruptible power supply, for causing the operation of said cut-off means to the closed position, in the event of an earthquake detected by said detector means; and
(e) a first manually operable by-pass valve, being disposed within said first enclosure, connected across said cut-off means, and operable from the exterior of said enclosure, for by-passing said cut-off means in the event of system failure causing the operation of said cut-off means to the closed position, thereby permitting flow of the utility to the building.

12. A system as in claim 11, and further comprising:

(a) a second enclosure for housing said uninterruptible power supply and said seismic detector means, thereby providing a compact assembly.

13. A system as in claim 12, and further comprising:
(a) a second electrically operated cut-off means, disposed within said first enclosure, having opened and closed positions, connected to a second utility supply main to the building and connected to said uninterruptible power supply for controlling the flow of the second utility therethrough; and
(b) a second manually operable by-pass valve, disposed within said first enclosure, connected across said second electrically operated cut-off means, and operable from the exterior of said first enclosure, for by-passing said second electrically operated cut-off means in the event of system failure causing the operation of said second electrically operated cut-off means to the closed position, thereby permitting the flow of the second utility to the building.

14. A system as in claim 13, and further comprising:
(a) an electrically operated breaker trip means operably associated with the main power supply breaker in the building, connected to said uninterruptible power supply and said seismic detector means, for tripping the main power supply breaker and thereby interrupting the main power supply to the building upon an occurrence of an earthquake detected by said seismic detector means.

15. A system as in claim 14, and further comprising:
(a) audio-visual alarm, connected to said uninterruptible power supply and responsive to an earthquake detected by said seismic detector means, for providing an indication to occupants of the building that an earthquake has been detected.

* * * * *